United States Patent [19]

Bleak et al.

[11] 3,940,593

[45] Feb. 24, 1976

[54] AUTOMATIC PROCESS CONTROLLER WITH DIGITAL MEMORY

[75] Inventors: Thomas M. Bleak, Whittier; Paul L. Hansen, Brea, both of Calif.

[73] Assignee: Beckman Instruments, Inc., Fullerton, Calif.

[22] Filed: Aug. 13, 1974

[21] Appl. No.: 497,098

[52] U.S. Cl. .............................. 235/150.1; 318/591
[51] Int. Cl.² ........................................ G05B 07/00
[58] Field of Search ...... 235/151.1, 150.1; 318/591; 340/347 AD

[56] References Cited
UNITED STATES PATENTS

| | | | |
|---|---|---|---|
| 3,694,633 | 9/1972 | Lejon | 235/151.1 |
| 3,725,762 | 4/1973 | Levesque | 318/591 |

OTHER PUBLICATIONS

Figure 15 on p. III–84 of AD Conversion Handbook, published by Analog Devices, Inc. Norwood, Mass. 6–1972.

*Primary Examiner*—Eugene G. Botz
*Attorney, Agent, or Firm*—R. J. Steinmeyer; N. E. Brunell

[57] ABSTRACT

An electronic process controller is disclosed having analog circuitry for generating an analog control signal, a digital memory for generating a manual control signal and digital circuitry for sequencing of the analog functions. This controller provides drift-free manual control in the manual control mode, tracking of the process control signal in the automatic mode to allow bumpless transfer from automatic mode to manual mode and output ramping to allow bumpless transfer to and from direct digital control mode.

7 Claims, 5 Drawing Figures

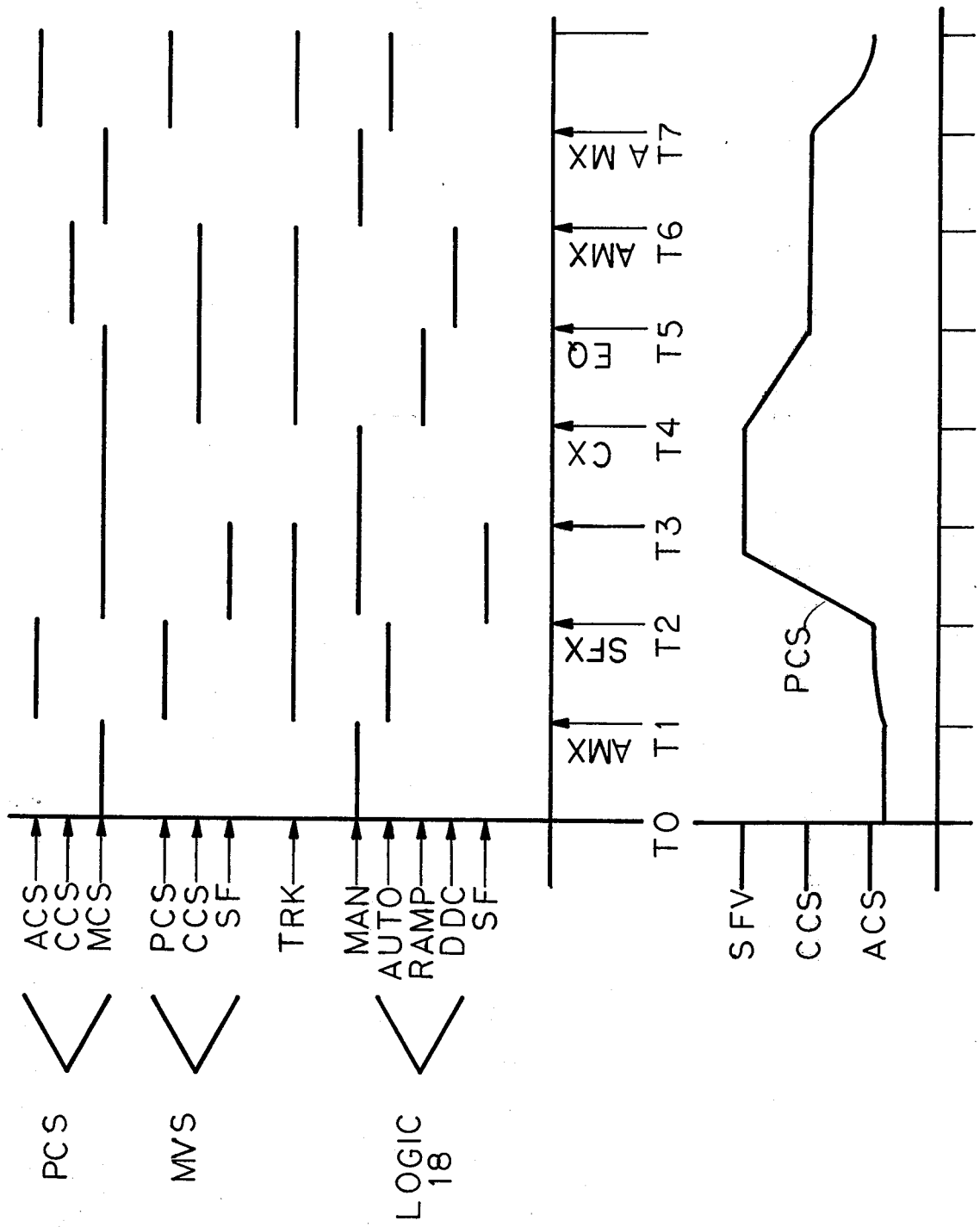

AUTOMATIC PROCESS CONTROLLER WITH DIGITAL MEMORY

BACKGROUND OF THE INVENTION

1. Field of the Invention

The instant invention is related to the automatic control of industrial processes. In a typical installation a process variable monitor or transmitter, such as a temperature probe, is used to generate a process value signal or PVS related to the present value of a process variable, such as temperature. A setpoint generator provides a set-point signal or SPS which is equal to or related to the desired value of the process variable signal as determined by process requirements. An automatic process controller is used to generate a process control signal or PCS which is used to control a final operator intimately related to the process variable such as a flow valve operator. In this manner the temperature of a liquid in a boiler, for example, may be controlled automatically by varying fluid flow through a valve.

This invention further relates to multi-mode process controllers of the type having automatic, manual and direct digital control modes of operation.

In the automatic control mode of operation a control circuit is used to generate an automatic control signal or ACS by applying a control algorithm, selected to fulfill process requirements, to a deviation signal related to the deviation of the process value signal from the set-point signal. In the automatic mode ACS is utilized as PCS to control the final operator to minimize the deviation of the process value from the set point.

In the manual control mode an adjustable memory device called the manual memory is used to generate a constant manual control signal or MCS related to a value stored in the memory which may be adjusted by a process operator or process engineer according to process requirements.

In the direct digital control or DDC mode a digital computer is used to generate a computer control signal of CCS by applying a control algorithm, selected to fulfill process requirements, to a deviation signal related to the deviation of the process value signal from the set-point signal. In this mode CCS is used as PCS to control the final operator to minimize the deviation of the process value from the set point.

This invention still further relates to automatic process controllers for use with process installations in which an abrupt change in the process control signal is undesirable. Such abrupt changes in PCS, called bumps, may be caused by transfer between modes of operation. This invention therefore particularly relates to automatic process controllers providing automatically bumpless transfer between modes of operation.

2. Description of the Prior Art

Early automatic process control installations utilized a non-automatic transfer system requiring a "balance" mode in order to achieve bumpless transfer. In such systems an operator was required to physically adjust certain values during the balance mode in accordance with other values displayed by the controller to avoid bumps during transfer between modes. Conventional approaches provide bumpless transfer between automatic and manual modes of control in various ways. A particularly good example of this type is shown in our copending U.S. application Ser. No. 497,097 filed on even date herewith. The approach shown therein provides bumpless transfer between automatic and manual modes of operation and also allows switching between set-point sources and adjustment of set-point values and control parameters to be accomplished bumplessly. Conventional approaches do not, however, provide for bumpless transfer between the DDC mode of operation and the other modes.

The conventional approach for providing a manual memory in order to generate MCS during the manual mode of operation is shown, for example, in U.S. Pat. Nos. 3,550,014; 3,523,193; and 3,655,992 in which a capacitor in the feedback circuit of an amplifier configured as an integrator is required to store the value of MCS during the manual mode. The obvious problem inherent with the utilization of a capacitor as a memory device is drift. Such conventional devices are reliable only in the short term and will change value by leakage of current from the critical high impedance node at the input to the integrator. It is difficult to maintain the integrity of a capacitor used as a memory device and under the best of conditions a capacitor cannot be prevented from drifting. Drift in the memory results in a slowly changing MCS and PCS making the process controller unreliable in the manual mode for long periods of time.

SUMMARY OF THE INVENTION

The instant invention provides a manual memory which may be utilized to generate MCS without drifting by utilizing an up-down counter to store a digital value representative of the MCS. A digital-to-analog converter responsive to the value stored in the counter is utilized to generate MCS. A comparator is provided at the up-down input of the counter and is arranged to cause the value stored in the counter to be equal to the analog value at one input to the comparator. The other input to the comparator is provided by the output of the digital-to-analog converter. Digital logic circuitry is provided to control and sequence switches provided in the process controller to allow the digital manual memory to track PCS during the automatic and DDC modes so that transfer from automatic or DDC to manual is bumpless.

The logic circuitry, in conjunction with the switches, allows transfer to the DDC mode of operation to be performed bumplessly because, upon transfer to DDC mode, MCS is used as PCS. MCS is then ramped to be equal to the value of the CCS at a predetermined clock rate compatible with process requirements whereupon CCS is used as PCS thereby completing the bumpless transfer.

In addition, a static fail function is provided in which the logic, when a static fail condition is detected by external means, bumplessly transfers the controller to the manual mode of control and changes MCS at a predetermined rate to be equal to a preselected static fail value.

BRIEF DESCRIPTION OF THE DRAWINGS

FIG. 3 is a series of graphical representations of the conditions of the switches shown in the analog circuitry in FIG. 2 on a common time axis depicting the sequence of changes caused by the digital logic circuitry in FIG. 1 in response to activity in the operator's interface of FIG. 1.

FIG. 4 is a graphical representation of the value of the process control signal supplied to the process on the same time axis used in FIG. 3.

DESCRIPTION OF THE PREFERRED EMBODIMENT

Figure 1:
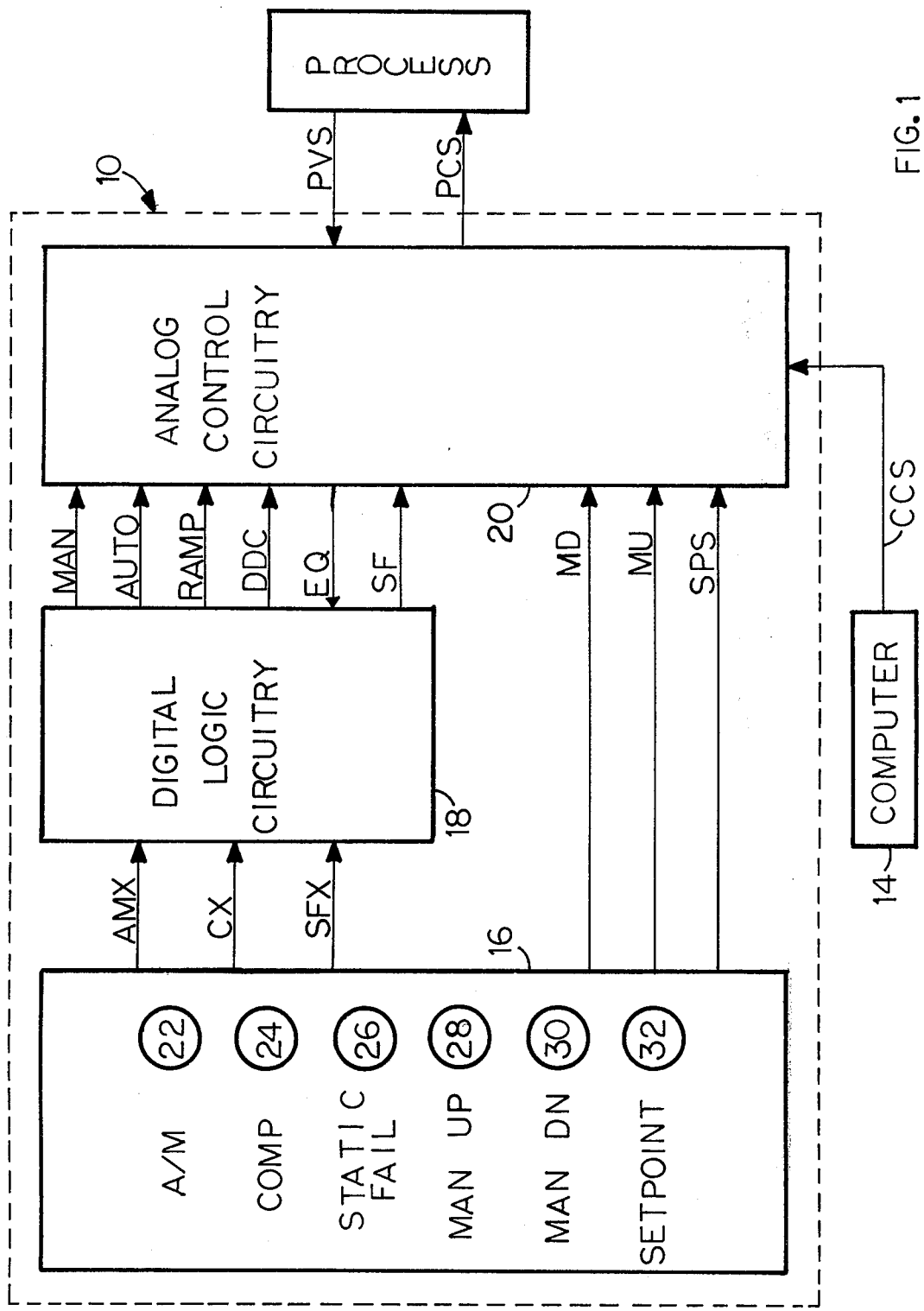
FIG. 1 is a block diagram showing an automatic process controller according to the instant invention including an operator's interface, digital logic circuitry and analog control circuitry with a digital memory.

A preferred embodiment of the instant invention will be described in general terms with reference to FIG. 1 which shows process controller 10 supplying the process control signal PCS to the process 12 and receiving the process value signal PVS therefrom. Computer 14 provides the computer control signal CCS to controller 10.

Operator's interface 16 within controller 10 allows the process operator or process engineer to vary the functions of the process controller. In particular, an automatic to manual transfer in either direction or a transfer from DDC to manual may be initiated by activation of pushbutton 22 which generates the signal AMX.

Transfer to computer control may be initiated by activation of the pushbutton 24 which generates the signal CX.

The occurrence of a static fail situation is detected by static fail detector 26, which may be a pushbutton available for activation by the operator, an alarm or monitor circuit or any external source not necessarily positioned in the operator's interface 16. For convenience, static fail detector 26 is shown in interface 16 and generates the signal SFX.

The process engineer may change the valve of the process control signal during the manual mode by activation of pushbutton 28 which generates the status signal MU to increase MCS or activation of pushbutton 30 which generates the status signal MD to decrease MCS. Set-point source 32, which is also shown in the operator's interface 16 for convenience, is an adjustable signal generator which generates set-point source signal SPS. Source 32 may also be a computer for providing supervisory control, another controller for providing cascade control or a combination of the above sources.

Digital logic circuitry 18 may be discrete digital electronic components or a time-shared portion of a digital computer. Digital logic 18 provides analog control circuitry 20 with MAN, AUTO, RAMP, DDC, SF, MD, and MD status signals and receives therefrom the EQ status signal, all in a manner described below with reference to FIG. 3.

Figure 5:
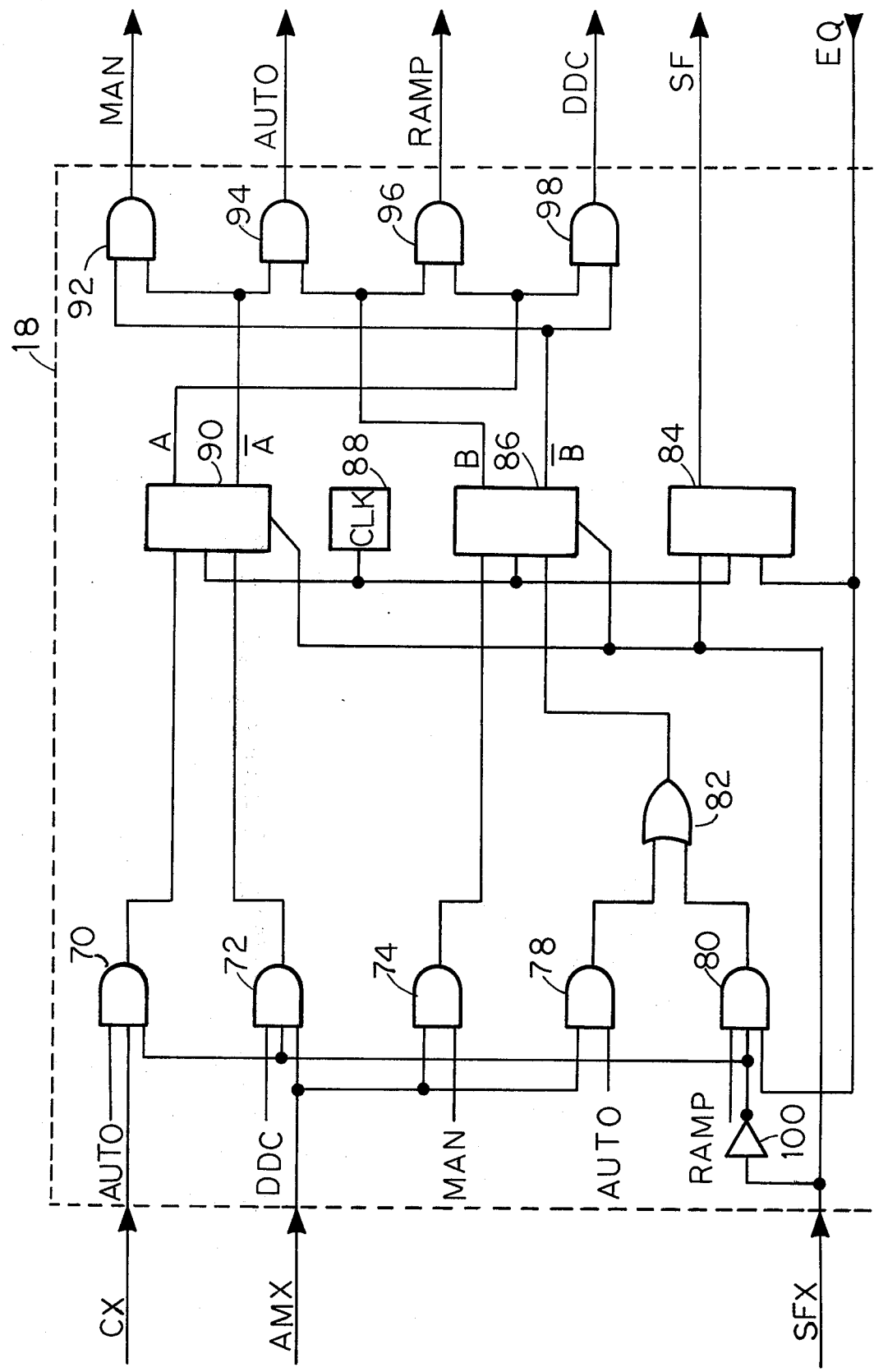
FIG. 5 is a block diagram schematic of the digital logic circuitry shown in FIG. 1.

FIG. 5 shows a block diagram schematic of digital logic circuitry 18. The heart of digital logic circuitry 18 is a pair of synchronous JK flip-flops 86 and 90, the outputs of which, B, B̄, A and Ā, are combined in AND gates 92, 94, 96 and 98 to generate the signals MAN, AUTO, RAMP and DDC respectively. In particular, the inputs to AND gate 92 are Ā B̄, to AND gate 94 are Ā B, to AND gate 96 are AB and to AND gate 98 are A B̄. The set input of flip-flop 90 is provided as the output of AND gate 70, the inputs of which are AUTO, CX and SFX after inversion in inverter 100. The synchronous reset input to flip-flop 90 is the output of AND gate 72, the inputs of which are DDC, AMX and SFX inverted. The set input to flip-flop 86 is the output of AND gate 74, the inputs of which are MAN and AMX. The synchronous reset input to flip-flop 86 is the output of OR gate 82, the inputs to which are the outputs of AND gates 78 and 80. The inputs for AND gate 78 are AMX and AUTO and the inputs to AND gate 80 are RAMP, SFX inverted and EQ which is supplied from analog control circuitry 20. The signal SF is provided by flip-flop 84 which receives SFX as its corresponding set input. SFX also directly resets flip-flops 86 and 90. The synchronous reset input to flip-flop 84 is provided by EQ. All three flip-flops are driven by clock 88 the period of which is equal to the width of the pulses for CX, AMX and SFX.

Figure 2:
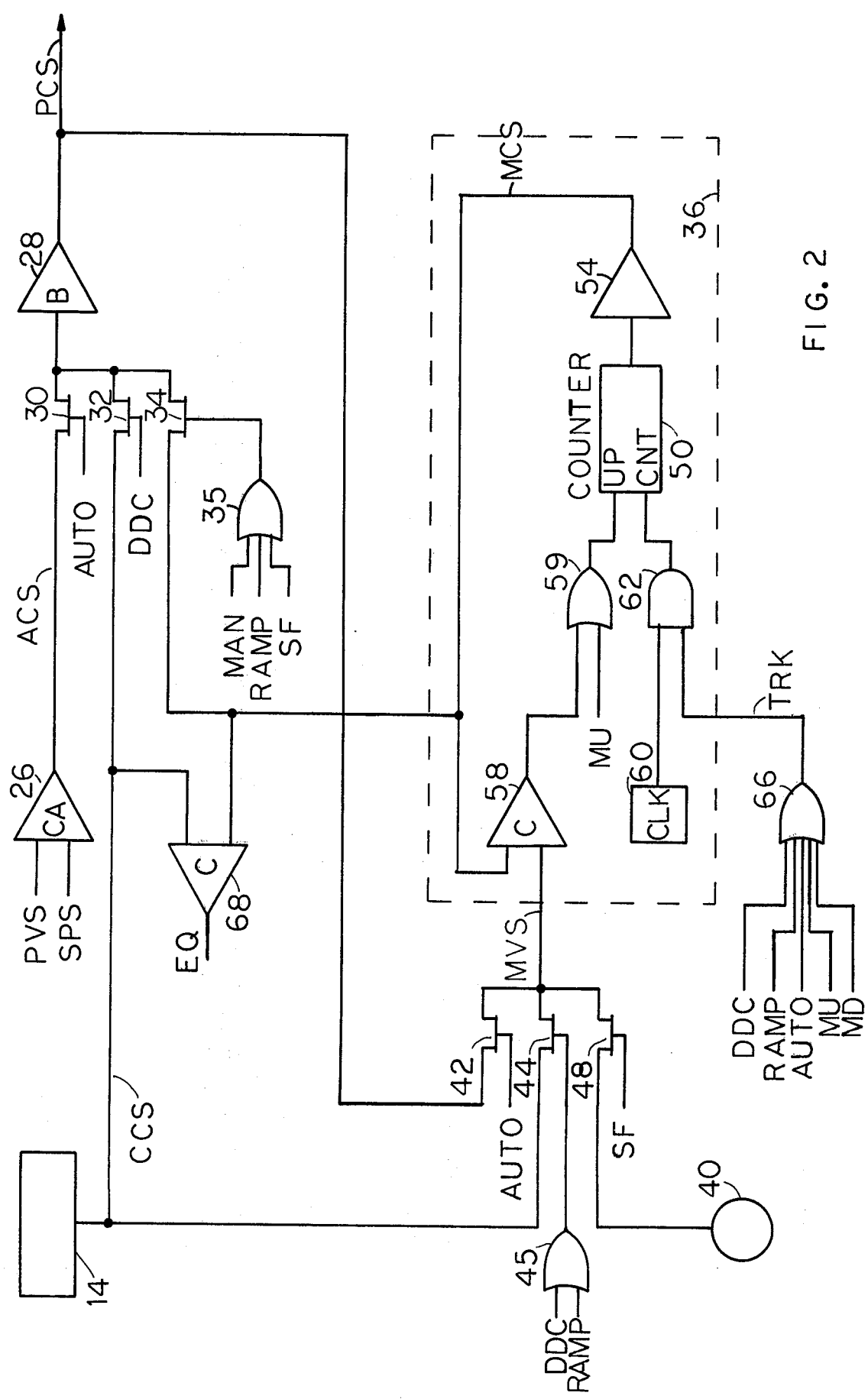
FIG. 2 is a block diagram schematic of the analog control circuitry with digital memory shown in FIG. 1.

It is convenient at this point to describe in detail the configuration of the devices within analog control circuitry 20 by reference to FIG. 2. Thereafter the required operation of digital logic circuitry 18 may be easily explained with reference to FIG. 3.

FIG. 2 shows the circuitry contained in analog control circuitry 20 to FIG. 1 in which a basic analog automatic process controller is represented by control algorithm comparator 26 which generates an automatic control signal ACS in response to the deviation between PVS and SPS. Manual memory 36 generates the manual control signal MCS and computer 14 generates the computer control signal CCS.

Switches 30, 32 and 34 are utilized to apply ACS, CCS, or MCS to the input of buffer 28 to be used as PCS in response to digital status signals generated by digital logic circuitry 18. In particular AUTO activates switch 30, DDC activates switch 32, and MAN, RAMP and SF are combined in OR gate 35 to activate switch 34.

Manual memory 36 is a track and store circuit which, by proper activation of certain switches, serves to track an analog input signal used as the manual value signal MVS and/or generate the manual control signal MCS based upon the value stored in its memory.

Manual memory 36 includes a conventional up-down counter 50 which has an "up" input and a "count" input. The digital value stored in counter 50 is converted to the analog MCS value by a conventional digital-to-analog converter 54.

The up input of counter 50 is supplied by the output of OR gate 59 which combines the signal MU and the output of comparator 58. Comparator 58 receives as inputs MCS and an analog manual value signal MVS.

The count input of counter 50 is provided by clock 60 through AND gate 62 when a track signal TRK is received. OR gate 66 combines the digital signals DDC, RAMP, AUTO, MU and MD to generate TRK. When OR gate 66 generates TRK this arrangement causes counter 50 to increase the digital value stored in counter 50 if MVS is greater than MCS and alternately causes counter 50 to reduce the digital value if MCS is greater than MVS. This obviously results in MCS being maintained equal to MVS within the resolution of the counter.

Switches 42, 44 and 48 serve to connect PCS, CCS or the output of static fail source 40 to the input of comparator 58 as MVS. Switch 42 is activated by AUTO, switch 44 is activated by the output of OR gate 45 which combines DDC and RAMP, and switch 48 is activated by SF.

Equality comparator 68 is utilized to generate the status signal EQ when MCS equals CCS.

The operation of digital logic circuitry 18 may be best explained with reference to FIG. 3. The actual logic circuitry or the programming required to generate signals MAN, AUTO, RAMP, DDC and SF in response to the input signals AMX, SF, CX, and EQ may easily be configured by reference to FIG. 3. In addition, FIG. 3 also shows the result of the presence of the output signals of logic 18 on the analog circuitry present in FIG. 2. That is, on the same time scale, a graphical representation of the source of PCS and MVS is shown together with TRK.

An arbitrary sequence of signals generated in operator's interface 16 will be used to explain the operation of the instant invention. At time T0 the controller is in the manual control mode. This means that logic circuitry 18 is generating the MAN signal, TRK is not present so that memory 36 is in its store condition and switches 42, 44 and 48 are not activated so that no signal is present to be utilized as MVS. In addition PCS supplied to the process is determined by switch 34 and is MCS.

FIG. 4 is helpful in invisualizing the bumplessness of the transfers to be described hereinbelow. At time T0 the value of PCS which is plotted against the same time scale as FIG. 3 is shown at an arbitrarily chosen level. Until time T1 when AMX is generated by activation of pushbutton 22 PCS may be adjusted manually by activation of pushbutton 28 to increase its value or pushbutton 30 to decrease its value.

At time T1 the operator activates pushbutton 22 to transfer the controller to the automatic mode of control. This requires logic 18 to generate the AUTO signal. The AUTO signal results in the presence of TRK and means that PCS is supplied by ACS and PCS is used as MVS. With reference again to FIG. 4 it can be seen that PCS moves to the level required by control algorithm 26 shown in FIG. 4 as level ACS.

At time T2 static fail detector 26 detects a static fail condition so that digital logic circuitry 18 generates SF. This results in the presence of TRK so that memory 36 follows the signal generated by the static fail source as MVS. In this condition the controller is in the manual mode of control as evidenced by the fact that PCS is supplied by MCS. With reference to FIG. 4 it can be seen that PCS ramps from the value determined by control algorithm 26 to the static fail value. This ramping occurs at a rate determined by clock 60. It may be convenient to provide additional circuitry so that the clock rate under this condition may be different than the clock rate under other conditions.

Time T3 is the end of the static fail condition. The output of logic circuitry 18 is MAN resulting in the absence of TRK and MVS. PCS is supplied by MCS. With reference to FIG. 4 it can be seen that PCS is maintained at its last value.

At time T4 the operator activates the computer control pushbutton 24 which generates CX. In response digital logic circuitry 18 generates RAMP which results in the presence of TRK. MVS is supplied by CCS and PCS is supplied by MCS. With reference to FIG. 4 it can be seen that the value of PCS is ramped toward the value of CCS. During this period the value stored in memory 36 is being changed to be equal to CCS generated by the computer 14.

At time T5 comparator 68 generates the EQ signal signifying that MCS has been made equal to CCS. Logic circuitry 18 therefore generates the DDC signal. This results in the presence of TRK with CCS being supplied as MVS. The PCS is now supplied by CCS also. Under these conditions the computer is in control of the process control signal. Any changes required by the computer result in a change in CCS which directly changes PCS.

At time T6 auto manual pushbutton transfer 22 is activated to remove the controller from the computer control mode. Even if it is desired to transfer the controller to the automatic mode of control from the DDC mode of control it is first necessary to transfer to the manual mode of control. Therefore at time T6, logic circuitry 18 generates the MAN signal resulting in the absence of TRK and MVS. PCS is supplied by MCS. As can be seen with reference to FIG. 4 PCS is maintained at its last value by manual memory 36. At time T7 pushbutton 22 is activated to return the controller to the automatic mode of control. Logic circuitry 18 therefore generates AUTO which results in TRK. PCS is supplied to memory 36 as MVS and ACS is supplied to the process as PCS. It can be seen with reference to FIG. 4 that upon transfer to the automatic mode of control PCS returns to the value determined by control algorithm 26.

It must be noted here that transfer from manual to automatic is not necessarily bumpless unless ACS is caused to be equal to MCS at the time of such transfer. Apparatus for causing such a result forms no part of the instant disclosure.

Logic circuitry 18 may therefore be configured in any conventional manner to accept the above described inputs and generate the above described outputs in the proper sequence in order to control analog circuitry 20 in the sequence described with reference to FIGS. 3 and 4.

The operation of controller 10 may therefore be summarized as follows with respect to a transfer from the DDC mode to the manual mode. During the DDC mode manual memory 36 is caused to generate MCS equal to CCS. Therefore at the instant of transfer PCS is not bumped. A transfer from the automatic mode or the manual mode is accomplished bumplessly by placing the controller in the manual mode of operation while adjusting MCS to be equal to CCS at a predetermined clock rate compatible with the process. When MCS is equal to CCS, CCS is then supplied to the process as the process control signal PCS.

What is claimed is:

1. An improved automatic process controller operable in manual, automatic and DDC modes, of the type having;

automatic control means for generating an automatic control signal during the automatic mode related to the deviation of a process value signal from a setpoint signal and tracking a manual control signal during the manual mode;

manual control means for generating the manual control signal during the manual mode and tracking the automatic control signal during the automatic mode;

computer control means for generating a DDC signal related to a value generated in a computer during the DDC mode, an output switch for selectively applying one of the control signals to the process to be controlled, wherein the improvement comprises:

a DDC switch for initiating a transfer to the DDC mode;

logic means responsive to the DDC switch for operating the output switch to apply the manual control signal to the process when a transfer to the DDC mode is initiated;

means responsive to the logic means for adjusting the manual control signal to become equal to the DDC signal at a rate compatible with process requirements; and equality detecting means responsive to the logic means for operating the output switch to apply the DDC signal to the process after the manual control signal has become equal to the DDC signal.

2. The improved controller of claim 1 wherein the improvement further comprises:

means to cause the manual control signal to track the DDC signal during the DDC mode;

a transfer switch for initiating transfer from the DDC mode; and means responsive to the transfer switch for operating the output switch to apply the manual control signal to the process when a transfer is initiated.

3. An improved process controller operable in manual and automatic modes of the type having automatic control means for generating an automatic control signal applied to the process during the automatic mode, wherein the improvement comprises:

a digital-to-analog converter for generating a manual control signal applied to the process during the manual mode based on a digital value;

an up-down counter for storing the digital value;

a clock pulse generator applied to a count input of the counter; and a comparator applied to an up input of the counter receiving a manual value signal and the manual control signal;

and means to apply the automatic control signal as the manual value signal during the automatic mode.

4. The improved controller of claim 3 of the type having a DDC control means for generating a DDC signal during a DDC mode, wherein the improvement further comprises:

a a DDC switch for initiating a transfer to the DDC mode;

means responsive to the DDC switch for applying the manual control signal to the process when a transfer is initiated;

means responsive to the DDC switch to apply the DDC signal to the comparator as the manual value signal when a transfer is initiated; and means to apply the DDC signal to the process after the manual control signal becomes equal to the DDC signal.

5. The improved controller of claim 4 wherein the improvement further comprises:

a second transfer switch for initiating a transfer from the DDC mode;

means responsive to the second transfer switch for applying the manual control signal to the process when a transfer from the DDC mode is initiated.

6. The method of bumplessly operating a process controller to transfer to a DDC mode, comprising the steps of:

applying a manual control signal to the process when a transfer is initiated equal to the value of the signal applied to the process before the transfer was initiated;

adjusting the manual control signal to be equal to a DDC signal at a rate compatible with process requirements; and applying the DDC signal to the process when the manual control signal has been made equal to the DDC signal to complete the transfer.

7. The method of operating the process controller as claimed in claim 6 to transfer from the DDC mode, comprising the steps of:

adjusting the manual control signal to track the DDC signal during the DDC mode, and applying the manual control signal to the process to transfer from the DDC mode.

* * * * *